United States Patent
Netke et al.

(10) Patent No.: US 12,032,720 B2
(45) Date of Patent: Jul. 9, 2024

(54) REAL TIME PSEUDONYMIZATION OF PERSONALLY IDENTIFIABLE INFORMATION (PII) FOR SECURE REMOTE PROCESSING

(71) Applicant: Amberoon, Inc., Cupertino, CA (US)

(72) Inventors: Shirish Netke, Cupertino, CA (US); Upendra Mardikar, Cupertino, CA (US)

(73) Assignee: Amberoon, Inc., Cupertino, CA (US)

(*) Notice: Subject to any disclaimer, the term of this patent is extended or adjusted under 35 U.S.C. 154(b) by 225 days.

(21) Appl. No.: 17/531,881

(22) Filed: Nov. 22, 2021

(65) Prior Publication Data
US 2022/0164474 A1   May 26, 2022

Related U.S. Application Data

(60) Provisional application No. 63/117,319, filed on Nov. 23, 2020.

(51) Int. Cl.
*H04L 29/06*   (2006.01)
*G06F 21/62*   (2013.01)

(52) U.S. Cl.
CPC ................. *G06F 21/6245* (2013.01)

(58) Field of Classification Search
CPC .................................................. G06F 21/6245
See application file for complete search history.

(56) References Cited

U.S. PATENT DOCUMENTS

| | | | |
|---|---|---|---|
| 8,751,399 B2 | 6/2014 | Kolhatkar et al. | |
| 10,200,407 B1* | 2/2019 | Dawkins | H04L 51/18 |
| 2017/0116436 A1* | 4/2017 | Wu | H04W 12/02 |
| 2021/0182859 A1* | 6/2021 | Srinivasa Rao | G06Q 20/4016 |

OTHER PUBLICATIONS

Sedayao, "Enhancing cloud security using data anonymization", Intel IT Best Practices, Cloud Computing and Information Security, Jun. 2012.
George, R.S et al. "Data anonymization and integrity checking in cloud computing", Proceedings of the 4th ICCCNT, Jul. 4-6, 2013, Tiruchengode, India.

\* cited by examiner

*Primary Examiner* — Jason K Gee
(74) *Attorney, Agent, or Firm* — David J. Thibodeau, Jr.; VLP Law Group LLP

(57) ABSTRACT

An approach for real time, round trip pseudonymization (a.k.a. anonymization or tokenization) of data on the fly, in real time, enabling remote secure processing of sensitive data such as by a cloud service. Sensitive data remains on premises with the client at all times. A user may thus run extensive queries that return sensitive data without noticing that such data was pseudonymized in transit.

9 Claims, 3 Drawing Sheets

300

310 start 312 make original data set available 314 identify columns with PII 316 generate map for high speed store 318 generate pseudonymized file 320 send pseudonymized file to cloud 322 ready

350 user provides URL <IP-address:port><command-string>

352 intercept URL at port 354 remove PII from <command-string> (using high speed store)

356 forward pseudonymized <command-string> to cloud 358 cloud performs command, returns result 360 intercept result 362 reinsert PII into result (using high speed store)

364 return result with PII

Fig. 3

REAL TIME PSEUDONYMIZATION OF PERSONALLY IDENTIFIABLE INFORMATION (PII) FOR SECURE REMOTE PROCESSING

CROSS REFERENCE TO RELATED APPLICATIONS

This application claims priority to a U.S. Provisional Patent Application Ser. No. 63/117,319 filed Nov. 23, 2020 entitled, "REAL TIME PSEUDONYMIZATION OF PERSONALLY IDENTIFIABLE INFORMATION (PII) FOR SECURE REMOTE PROCESSING", the entire contents of which are hereby incorporated by reference.

BACKGROUND

This patent relates to data processing, and in particular to real time, on the fly, data pseudonymization round trip (to and from) a client to a cloud data processing resource.

The past decade has seen widespread adoption of cloud computing solutions such as Amazon AWS, IBM Cloud and Microsoft Azure. Cloud solutions avoid the cost and effort to maintain traditional data processing machines on premises and many other well-known benefits.

But moving data and processes to a remote cloud does not come without risk. The adoption of cloud models for certain organizations that handle sensitive information—such as financial institutions—presents many challenges. Those heavily regulated industries must observe complex risk reduction and compliance requirements imposed by governments and their management.

Many financial institutions are required to have systems in place to detect illegal activities by their customers such as money laundering, tax evasion, and attempted fraud. Monitoring every transaction for these possibilities can be an insurmountable task, especially for small institutions.

Other industries, such as insurance and health care are also often reluctant to place sensitive and valuable customer data in infrastructure that they do not control. This is especially true in Europe, where rules such as the General Data Protection Regulation (GDPR) impose requirements on almost every business. Within the United States, certain local authorities such as the State of California and 15 other states have imposed varying requirements for securing customer data.

These organizations are also increasingly looking to use advanced analytics (AA), artificial intelligence (AI), machine learning and other tools for assessing and mitigating such risk. However, security concerns have typically required developing and deploying complex, on premises, appliances and other infrastructure to support these applications.

Anonymization is a known privacy technique that translates data so that it becomes worthless to anyone except the data owner. Because key pieces of confidential data are obscured, the anonymized data can be stored or processed by cloud services with minimal risk that unauthorized individuals will benefit from accessing it. See for example, George, R. S. et al. in "Data anonymization and integrity checking in cloud computing", *Proceedings of the 4th ICCCNT*, Jul. 4-6, 2013, Tiruchengode, India.

In one scheme proposed by Intel Corporation, anonymization takes place on secure virtual machines on premesis. See the white paper by Sedayao, "Enhancing cloud security using data anonymization", Intel IT Best Practices, Cloud Computing and Information Security, June 2012, https://www.researchgate.net/publication/272682947/

SUMMARY

This patent application describes apparatus and methods for converting original (or "real") data sets that include sensitive information to pseudonymized (or anonymized or tokenized) data sets, and also converts pseudonymized (or anonymized or tokenized) data back to the original data populated with the sensitive information. The conversion occurs in both directions and in real time.

The pseudonymized (or anonymized or tokenized) data may be handled by a remote data processor, such as those operated by a cloud service, but without the remote processor or cloud service needing to access or store any sensitive information.

The system can be set up to ingest the original data sets from secure sources to generate a pseudonymized file for storage and use by a cloud service. The cloud service may provide access to resources such as analytics, machine learning, or other algorithms designed to detect anomalies such as fraud detection or Anti-Money Laundering (AML) algorithms in the pseudonymized data.

In one particular example implementation, a computer-implemented system includes a client processor, a browser component, an intercept component, a high speed data store, and a file store. A user interacts with the client to access a cloud service. The cloud service has been pre-populated, in this example, with pseudonymized data sets for which a conversion table has previously been generated. The conversion table, which may be stored in high-speed data store, may, for example, map Personally Identifiable Information (PII) to pseudonymized data. The intercept component, which may intercept commands in the form of URLs presented from a browser program, intercepts any data processing commands intended for the cloud service to process the pseudonymized data sets. The intercept component pseudonymizes the commands by accessing the conversion table (?) as now stored in the high speed data store. Responses coming back from the cloud service are intercepted and de-pseudonymized before being returned to the client.

BRIEF DESCRIPTION OF THE DRAWINGS

FIG. 2 is an example logical flow for initial setup.
FIG. 3 is an example logical flow for processing a client request.

DETAILED DESCRIPTION OF A PREFERRED EMBODIMENT

Figure 1:
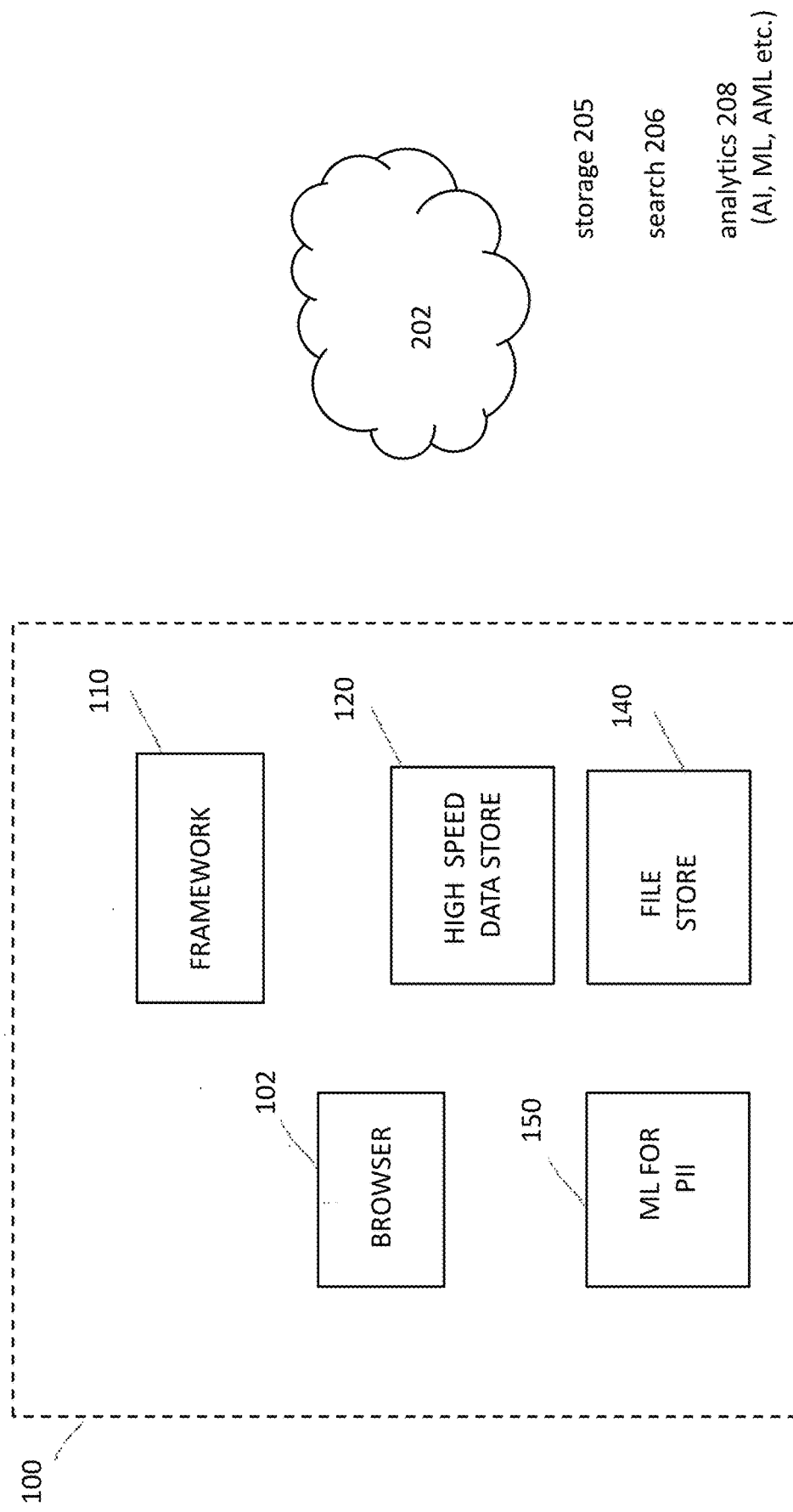
FIG. 1 is a block diagram of an example system.

FIG. 1 illustrates components of a system that enables a user to access cloud-based data processing resources to handle sensitive information, such as but not limited to Personally Identifiable Information (PII), while at the same time ensuring that such sensitive information remains within secure or trusted components. Pseudonymization (or anonymization or tokenization) of original data happens on demand, in real time, in response to the user's requests, within the confines of the secure environment, and in a way that remains transparent to the user.

The system may be used by an organization such as a bank, brokerage firm, credit or debit issuing company, health care or other medical provider, insurance company, or any other entity that has a need to handle, process, and run analytics on sensitive data sets in the cloud.

The example system consists primarily of a client data processor 100 and cloud resources 202.

The client 100 may be implemented in many different ways. It may be a physical or virtual computer. The computer may be running an operating system such as Ubuntu Linux. Or, the client may be other types of computers, such as a server, or a mobile device, or a tablet, and/or the client may run other types of operating systems. In addition, the client may be a virtual desktop, or virtual application, or other data processing environment running within a virtual machine. In still other cases, the client 100 may be a hybrid cloud solution such as Azure Stack or AWS Outposts, Google Cloud Platform, IBM Cloud, or other similar data processing solutions which may be physically on premises of the user, but may not, and in other instances the client 100 might be running in various types of private cloud environments.

What is important is that the client 100 operates within an environment that is secure enough to be trusted to provide and control access to data sets that contain sensitive information. The types of sensitive information may include Personally Identifiable Information (PII) (in a case where the system is used by a bank or other financial institution), or Electronic Protected Health Information (ePHI) (where the system is used by a health care provider). Or the protected information may be other collections of information needing protection, such as customer names, addresses, and their credit card numbers where the system is used by an e-commerce vendor.

In one example implementation, the client 100 executes a browser program 102 or other user interface for (a) initial ingestion and conversion of the data sets to remove sensitive information, and uploading the converted data sets to the cloud resources 202 and (b) subsequent handling of requests made from the client 100 to the cloud resources 202.

As used herein, "pseudonymization" refers to a de-identification procedure by which sensitive information, such as Personally Identifiable Information (PII) fields within a data record, are replaced by one or more artificial identifiers, or pseudonyms.

For example, the GDPR defines pseudonymization as "the processing of personal data in such a way that the data can no longer be attributed to a specific data subject without the use of additional information." To pseudonymize a data set, the "additional information" must be "kept separately and subject to technical and organizational measures to ensure non-attribution to an identified or identifiable person." The California Civil Code defines "pseudonymize" or "pseudonymization" (Ca. § 1798.140(r)) as " . . . the processing of personal information in a manner that renders the personal information no longer attributable to a specific consumer without the use of additional information, provided that the additional information is kept separately and is subject to technical and organizational measures to ensure that the personal information is not attributed to an identified or identifiable consumer."

The processes herein can also be considered to be a form of data "anonymization" where any sensitive information can no longer be identified in a data record. "Anonymization" is generally considered to be a type of information sanitization that includes a process of removing personally identifiable information from data sets, so that the people whom the data describe remain anonymous.

The processes discussed herein can also leverage a form of "tokenization" whereby a randomly generated identifier is substituted for a sensitive piece of data.

It should be understood, therefore, that the term "pseudonymization" as used herein, also includes "anonymization" and "tokenization" and that these terms are intended to be broadly interpreted as any technique for removing or replacing sensitive data.

Data pseudonymization and/or anonymization and/or tokenization, as used herein, enable the transfer of PII, ePHI, or other sensitive information across a trust boundary, such as between the trust client 100 and data processing functions located in a remote cloud 202 which might not be a trusted environment. This access is provided while reducing risk of unintended disclosure of the protected information, and in in a manner that enables evaluation and analytics using the vast resources available in the cloud 202, post-anonymization.

The cloud resources 202 may include many types of Software as a Service (SaaS) functions of interest to the user of the client 100. These might include simple functions such as data storage and retrieval 205, or search 206, or more sophisticated operations such as analytics 208. The analytics tools 208 may include applications tailored to the user's needs and may include logic to implement big data analytics, artificial intelligence, machine learning, or application specific algorithms such as fraud or anti-money laundering (AML) detection logic.

The cloud resources may be provided by cloud services 202 such as those available from Elastic (Elastic Stack/Elastic Cloud), Amazon Web Services (AWS), Microsoft Azure, IBM Cloud, and many other vendors of public and/or hybrid public/private cloud infrastructure.

It should be understood that multiple clients 100 may be accessing the cloud resources 202 at a given time. These multiple clients 100 may not all belong to the same organization. In such an instance the cloud resources 202 should be configured with the typical security and authentication features to prevent access of one client's data by another customer or unauthorized user.

One example implementation of the client 100 includes components such as a lightweight framework 110, a high speed data store 120, file store 140, and optional machine learning component 150.

Among other functions described herein, the framework 110 is responsible for generating pseudonymized data from source ("original") data. The framework 110 may include a lightweight, open source, server process such as Flask. However, it can take many other forms such as any thread executing on the client 100 (or running outside the client 100 but accessible to it). The framework 110 performs other functions, such as intercepting requests from the browser to the cloud 202.

The high-speed data store 120 is responsible for stores one or more mappings between the source data containing PII and the pseudonymized data. The data store 120 is also accessible to the framework 110. One example implementation may use an open source, persistent key-value store as the high-speed data store 120. However, the data store need not be organized as a database—it can be a simple table, list, or other data store. Also, high speed data may not necessarily be in-memory within the physical or virtual processor that implements client 100. It can be on a solid state disk (SSD), or even an array of load balanced, external data store components that are shared and accessible to multiple clients 100. In that latter instance, the storage array might implement a server. What is important is that data store is rapidly searchable, enabling the framework 110 to identify sensitive information in data records or commands in real time.

Some implementations may use hardware to provide the mapping; others may use software. For example, one implementation that is anonymizing PII may use a hardware random number generator that is based on a system clock. However, a different implementation, which may be pseudonymizing the PII, may use a software implementation of a pseudo-random number (PRN) generator. It should be understood that there are many known algorithms for generating random numbers and PRN codes, and the appropriate one will depend on the preference or the specific application.

The specific methods and algorithms used to map the sensitive data to the converted "pseudonymized" data preferably operate such that the framework and the high speed data store remove or reinsert PII in real time. As used herein, "real time" describes compute operations or other processes that guarantee response times within a specified time (deadline), usually a relatively short time. A real-time process is one that happens in defined time steps of maximum duration and fast enough to affect the environment in which it occurs.

The framework 110 also acts as an endpoint to intercept requests from the client 100 to the cloud resources 202 and any responses coming back from the cloud 202. It is, therefore responsible for acting as a URL proxy, in some implementations, to intercept data and commands from the browser 102, pseudonymizing them, and then returning responses to the browser 102. Effectively, when a user requests a query to be run against a data set (or other command), that command is intercepted by the framework 110 and pseudonymized. The pseudonymized data is then forwarded to the cloud service 202. The framework is also responsible for processing any result returned from the cloud service 202, replacing any pseudonymized data in the result with the correspondingly mapped PII. The framework thus makes it transparent to the user's browser 102 that only pseudonymized data is stored in the cloud service.

Where the client 100 is running on Linux, these components (framework 110 and high-speed data store in the form of an in-memory database 120) may be provided and installed via a Docker Container. The components may be installed on an encrypted local disk. However, other installation methods are possible, and may depend on the type of operating system running on the client 102.

FIG. 2 is a logical flow for an initial setup procedure 300. The setup procedure 300 may be performed by a user with access to the client 100. This user may be an individual person within the organization interested in accessing the SaaS functions of the cloud resources 202; however, the steps in this initial flow may also be performed by an administrative user coordinating for other users.

At step 310, the framework 110 and high-speed data store are started.

At step 312, an original data set is then made accessible to the framework 110, such by placing a file in a root directory on the filestore 140. The original data set may be a CSV file, or XML, file, or in other formats readable by the framework 110 and/or the cloud service 202.

Next, at step 312, the client 100 sends a request to the framework 110 to generate an pseudonymized data file.

At step 314, fields (or columns) in the data set containing PII or other sensitive data are identified by or to the framework 110. It should be understood that each client typically has different formats for their different data sets. In one implementation, identification of the fields/columns to be protected can be programmed into the framework's 110 configuration.

The PII columns be identified in many other ways—such as by the user interacting with the framework 110, or by identifying a separate template file, or by encoding a designated row in the CSV file in a particular way.

Of course, different users of the system and their respective organizations will have different requirements for which fields or columns in a data set need to be protected. A financial institution may for example, consider a customer name and tax ID to need protection, but not the dollar value of a transaction. On the other hand, a health care provider may need to obscure not just the patient's name and their ID number, but even the cost of a service.

It may even be the case that different users within the same organization will have different needs for mapping PII.

In one implementation, a lightweight machine learning (ML) component 150 may reside within the client 100 to learn which fields are to be treated as containing sensitive information. The ML component 150, for example, may be trained that a field having three digits, a dash, two digits, a dash, and four digits is a likely United States' Social Security Number (SSN)—and anywhere such a field is detected, it should be protected. In another example, a hospital may train the ML 150 to recognize patient's medical insurance ID numbers. The ML component 150 may operate on data ingest, when original data is initially converted; but it may also operate during query processing.

At step 316, the framework 110 reads the original data file and populates the high speed data store with a mapping from the original PII data to pseudonymized data. Exact scheme for mapping PII to pseudonymized data is not particularly important, and can be any known mapping that is suitable for the particular client application.

At step 318, an pseudonymized data file (typically in the same CSV, XML or other format as the original data), but having the PII replaced with pseudonymized data is generated. This pseudonymized file may be identified to the client 100 at this point.

At step 320, the pseudonymized file is sent to the cloud service 202. This may be an automatic operation performed by the framework 110 in cooperation with a proxy, or the upload may be manually performed by the user interacting with the cloud service 202. The cloud service 202 stores the pseudonymized file in a secure location accessible only to the user and/or others in her organization.

At step 322, the client 100 is now set up to enable the user to access the cloud service 202 to perform search, analytics, intelligence, visualization and other functions of interest.

It should be understood that steps 312-322 may be necessary for each data set for which pseudonymization is desired.

At some subsequent time, a user may access the client 100 to perform a sequence of steps that operate on the data set. An example flow is in FIG. 3.

In step 350, the user starts a browser and provides a URL with a query string. The URL may specify an address of the server 110 and port such as http://<IP- address>:8080/<command-string> where <IP-address> is the address of the cloud service and <command-string> is one or more instructions (such as queries against a data set), the client wishes to run within the cloud service 202.

At 352, the URL is intercepted and read by the framework 110. The framework may, for example, be configured to intercept all http requests to port 8080. The framework may do this in many different ways, such as by coordinating with a extension to the browser 102, or a .NET framework element, filter, low level hardware interrupt, and in many other ways.

At 354, the proxy 130 removes any PII from the query string by accessing the mapping in the high speed data store 120.

At 356, the pseudonymized query is then forwarded to the cloud service 202. This may be by the framework 110 directly, or in a preferred arrangement by the framework 110 first returning the pseudonymized query command to the browser, which in turn forwards it to the cloud service 202.

At 358, the cloud service 202 performs the requested command (search, analytics, machine learning, artificial intelligence, or other function specified by the query), and returns a result.

At 360, the framework 110 intercepts the response from the cloud service 202, and at 362, the proxy accesses the high speed data store 130 to replace any pseudonymized data fields with their associated PII.

As a result, at step 364, when the browser 102 renders the result, the user sees only the "real" data—including PII—as was present in the original data set, and does not see any pseudonymized data.

Note also that the key store 120 which maps PII to pseudonymized data also remains within the trusted zone of the client 100, and does travel over the cloud 202. It can even be configured to avoid travelling over any local network, such as, for example, if each client maintains its own copy of the map in the high-speed data store 120.

Other functions may be performed by the framework 110. For example, multiple queries to the cloud service 202 may be handled as a MapReduce operation that references a group of data sets, performing a map task to first arrange those into the corresponding group of pseudonymized data sets broken down into tuples (key/value pairs) and the performing a reduce task, which takes the output from the map task and combines those data tuples into a smaller set of tuples that are actually sent to the cloud service. In other implementations, multiple threads of the SaaS application of interest can be spun up on the cloud service 202, and with the proxy then firing the map-reduced data sets at the cloud 202, and then remapping the results on the reverse path.

In another implementation, one or more components of a given framework 110 may service multiple clients 100, but that fact may be hidden from the cloud service and the users. For example, four users (User A, User B, User C and User D) may all have their respective high speed data store 120 components running within their respective trusted environments, but submit requests against their respective data sets to a shared proxy component. These requests, when received at the shared proxy, are split on the fly, creating multiple threads. Pseudonymized data is then pulled and inserted on the fly, and that pseudonymized data is then reduced (concatenated). The concatenated, pseudonymized data then gets forwarded to the cloud service 202.

In some embodiments, the pseudonymization mapping may be shared among clients or even among institutions. For example, in one implementation, a specific individual person may have accounts with three different banks, Bank A, Bank B, and Bank C. That persons' name, or other of his PII, may map to the same given pseudonymized field regardless of which institution (Bank A, Bank B, or Bank C) is using the system 100. However, in other instances, Banks A, B, and C may each have their own pseudonymized version of the individual's name.

The results then get returned to the same shared proxy. This proxy then takes the returned pseudonymized data, splits it into the multiple threads, which in turn access the corresponding local store, converting the data for each thread back to include its corresponding PII.

There are several advantageous aspects of the approaches described above.

They provide real time, round trip pseudonymization of sensitive information on the fly, enabling remote secure processing of any sensitive data such as by a cloud data processor. All sensitive data remains on premises, and is never provided to the cloud service.

The approach enables using existing cloud-based applications, such as big data analytics, artificial intelligence, and machine learning tools already deployed and supported by major SaaS vendors. This frees the institution from developing or even hosting such applications on premises.

With this approach, smaller banks and institutions have access to the same types of analytics that were previously only cost-effective for large institutions to host on-premises. It brings all of the advantages of cloud computing, including cost efficiency, scalability, the ability to quickly process complex data sets, and perform extensive analytics, all within a secure environment for such small enterprises.

Delays that might be associated with other approaches, such as batch processing of queries for pseudonymization, are avoided.

The framework 110 can also serve other functions such as keeping an audit trail of what data has left the premises, which queries have been run and by which user or which client, and so forth.

The pre-process flow of FIG. 2, combined with the use of a lightweight framework 110, high speed data store, to intercept, reformat and redirect the pseudonymized queries permits rapid, real time processing of PII in real time, on the fly.

These components may be based on open source code, to reduce any concern on the part of the institutional customer that that are locked into a proprietary solution.

Pseudonymization of data was discussed for certain embodiments above (where personally identifiable information fields within a data record are replaced by one or more artificial identifiers, or pseudonyms), where the processing is performed for a financial institution. It should be understood that the same procedures might apply more generally, for other use cases, such as to "anonymize" sensitive data contained in medical records, or for other applications.

The above description thus contains several example embodiments. It should be understood that while a particular feature may have been disclosed above with respect to only one of several embodiments, that particular feature may be combined with one or more other features of the other embodiments as may be desired and advantageous for any given or particular application.

It is, of course, not possible to describe every conceivable combination of components or methodologies for purposes of describing the innovations herein, and one skilled in the art may now, in light of the above description, recognize that many further combinations and permutations are possible.

Accordingly, the claimed subject matter is intended to embrace all such alterations, modifications, and variations that fall within the spirit and scope of the appended claims. Furthermore, to the extent that the terms "includes," and "including" and variants thereof are used in either the detailed description or the claims, these terms are intended to be inclusive in a manner similar to the term "comprising".

The invention claimed is:

1. A computer-implemented method comprising:

at an intercept component,
- receiving an original data set from a client;
- identifying fields within the data set that contain protected information;
- generating a pseudonymized data set by replacing fields containing protected information with substituted data;
- maintaining a map relating the protected information to the substituted data in a local data store that is local to the intercept component;
- forwarding the pseudonymized data set to a remote system; and subsequently, at the intercept component,
- intercepting a command from the client intended for processing by the remote system;
- pseudonymizing one or more fields within the command, by accessing the map as stored in the local data store, to generate a pseudonymized command, in real time;
- forwarding the pseudonymized command to the remote system; and subsequently, at the remote system,
- receiving the pseudonymized command without indication as to which fields contain protected information;
- processing the pseudonymized command and the pseudonymized data set, to generate a pseudonymized response having one or more pseudonymized response data fields;
- returning the pseudonymized response to the intercept component; and subsequently, at the intercept component;
- receiving the pseudonymized response from the remote system including the one or more pseudonymized response data fields;
- de-pseudonymizing, in real time, the one or more pseudonymous response data fields within the pseudonymized response, by accessing the map stored in the local data store to generate a de-pseudonymized response having the protected information; and
- transmitting the de-pseudonymized response with the protected information to the client.

2. The method of claim 1 wherein the protected information further comprises one or more selected fields that contain personally identifiable information.

3. The method of claim 1 additionally comprising, at the intercept component:
- intercepting the command from the client via a browser component; and
- displaying the de-pseudonymized response via the browser component.

4. The method of claim 1 wherein the processing the pseudonymized command further comprises one or more of search, data analytics, machine learning logic, or artificial intelligence logic.

5. The method of claim 1 wherein the processing the pseudonymized command further comprises an anti-money laundering algorithm.

6. The method of claim 1 wherein processing the pseudonymized command further comprises detecting anomalies in the pseudonymized command or the pseudonymized data set using machine learning logic or artificial intelligence.

7. The method of claim 1 wherein processing the pseudonymized command further comprises performing analytics on the pseudonymized data set.

8. The method of claim 1 wherein the remote system is a cloud service.

9. The method of claim 1 additionally wherein the intercept component uses an Application Programming Interface (API) for performing one or more of:
- receiving the original data set from the client;
- forwarding the pseudonymized command to the remote system;
- receiving the pseudonymized response from the remote system; or
- transmitting the de-pseudonymized response to the client.

* * * * *